United States Patent Office 3,039,243
Patented June 19, 1962

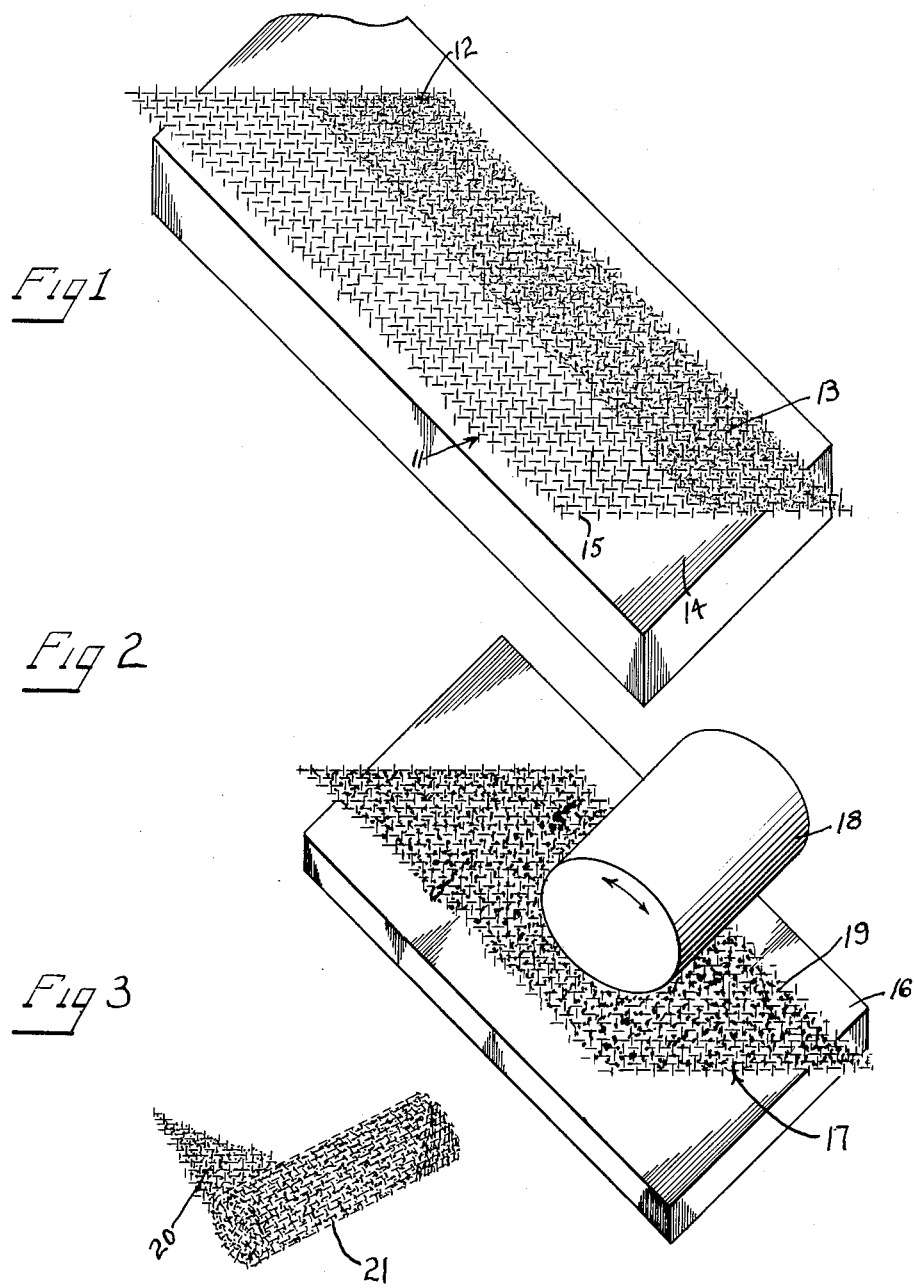

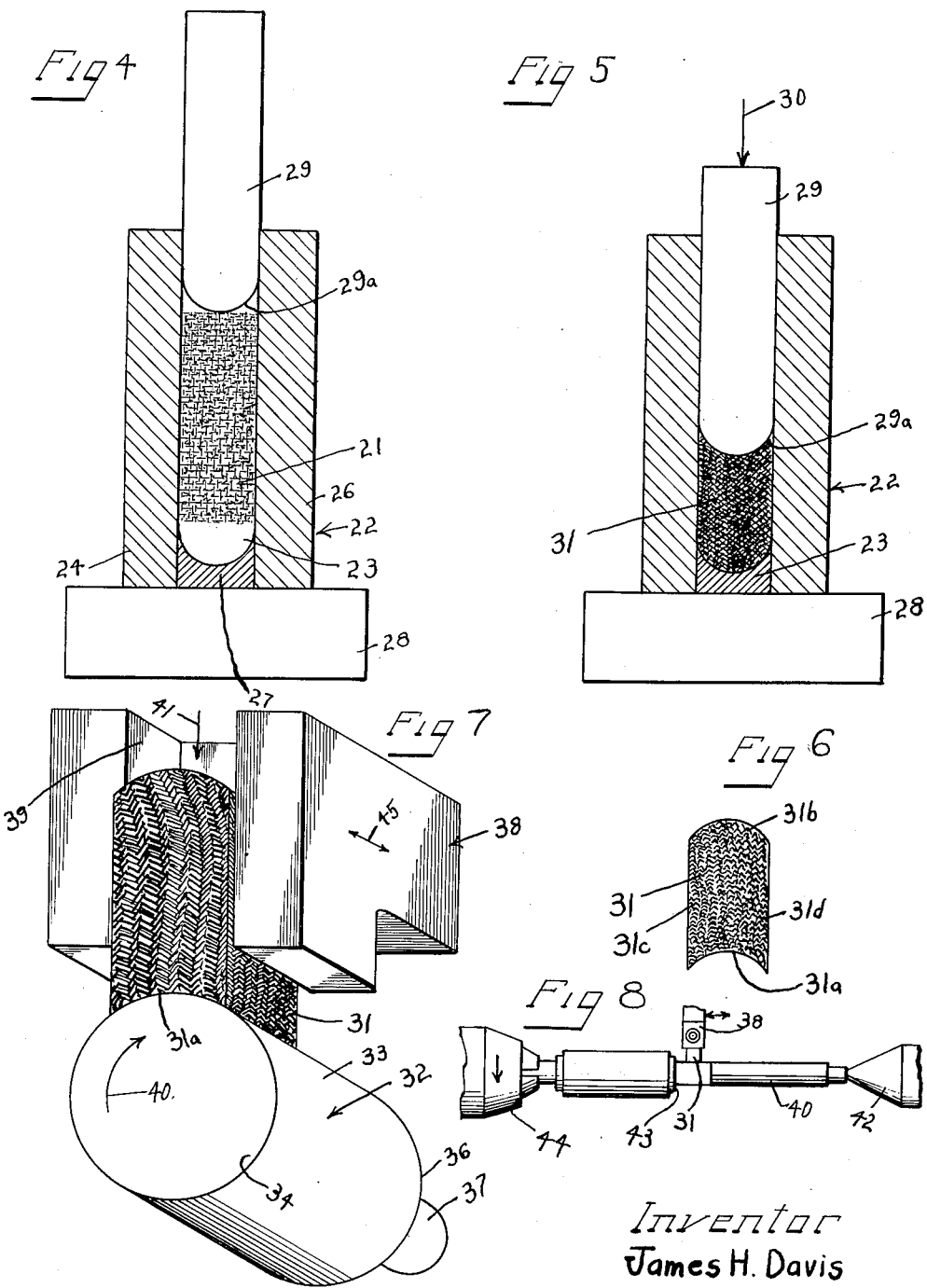

3,039,243
FINISHING METHOD AND APPARATUS
James H. Davis, Painesville, Ohio, assignor to Thompson Ramo Wooldridge Inc., Cleveland, Ohio, a corporation of Ohio
Filed Apr. 6, 1959, Ser. No. 804,271
10 Claims. (Cl. 51—204)

The present invention relates to an improved tool structure and method of making a tool for superfinishing metal surfaces.

In the art of finishing metal surfaces, superfinishing is a process used to produce improved controlled surface finishes which have improved features over surface finishes of other methods. In finishing operations which utilize turning, milling or grinding, heat is generated to change the micro structure of the metal surface and anneal the skin thus reducing hardness and producing a soft layer of amorphus material. In the process of superfinishing, fine grit or abrasives are used which do not generate the heat involved in other finishing processes, and which obtain a surface which is superior for uses in bearings, mill rolls and the like.

In superfinishing a surface such as a cylindrical bearing surface, a tool such as a stone formed of a stick of minute abrasive particles, with a face shaped to conform to the cylindrical surface of the work, is applied to the work with a pressure and is oscillated axially along the work as the workpiece is rotated. Due to the abrasive particles on the face of the tool in contact with the work, the result of the rotation of the workpiece and oscillation of the tool creates a crosshatch finishing pattern on the surface of the piece with each abrasive particle forming a path that is followed only once, so that the surface of the workpiece approaches perfection in smoothness with no directional characteristics. Tools, such as stones that were heretofore used were commonly brittle and fragile, so that breakage in handling and in machining was common, and was expensive. The stones required dressing and machining to the desired shape. Further, during superfinishing operation, variations in size of workpieces and other factors frequently caused the stones to be impacted against the workpiece or machinery, causing them to be damaged and broken.

Accordingly, it is an objective of the present invention to provide an improved tool for superfinishing metal surfaces which avoids the disadvantages presented in tools of the type heretofore used for superfinishing and which obtains a tool of a non-brittle and non-fragile nature, and which will not accidentally break during handling and during superfinishing operation.

Another object of the invention is to provide an improved method of producing and manufacturing a superfinishing tool having a uniform distribution of abrasive particles charged in a non-ferrous metal tool body.

Another object of the invention is to provide an improved superfinishing tool and method of making a tool utilizing a screen-like wire cloth of non-ferrous metal.

Another object of the invention is to provide an improved tool structure and method of making the tool wherein the abrasive particles are very uniformly distributed, and wherein the tool is self-wearing with the abrasive particles being relatively rigidly supported and maintained in their distributed locations during wearing of the tool to obtain improved superfinishing.

Another object of the invention is to provide an improved superfinishing tool wherein a particulate abrasive material is supported in a non-ferrous metal tool wherein the particles of abrasive are bonded by being forced into non-ferrous metal threads which form a cloth, and are compressed into a rigid mass to form the tool.

Other objects and advantages will become more apparent with the teaching of the principles of the invention in the disclosure of the preferred embodiment of the structure and method in the specification, claims and drawings, in which:

FIGURE 1 is a perspective view illustrating a step in the method of forming a tool embodying the principles of the present invention;

FIGURE 2 is a perspective view illustrating another step in the method of forming a tool;

FIGURE 3 is a perspective view illustrating another step in the sequence of forming the tool;

FIGURE 4 is an elevational view, shown partially in section and illustrating still another step in the sequence of forming the tool;

FIGURE 5 is an elevational view shown partially in section and illustrating the completion of the step of FIGURE 4;

FIGURE 6 is an elevational view illustrating the finished tool;

FIGURE 7 is a perspective view illustrating the use of the tool; and

FIGURE 8 is an elevational view also illustrating the use of the tool.

As shown on the drawings:

In the method of forming the tool for superfinishing a metal surface, as illustrated in FIGURE 1, a wire cloth 11 is charged with a particulate abrasive 12, as illustrated by the charged area 13. The wire cloth is supported on a surface 14.

The wire cloth is formed of threads or filaments 15 which are arranged such as by being woven into a screen-like, cloth-like layer, which is porous in nature to receive the particulate abrasive. The threads or filaments of the wire cloth are of a soft metal which is softer than the steel or steel alloy of the surface of the workpiece which is to be finished. The metal is preferably a non-ferrous metal, such as copper, aluminum, brass, bronze or the like, which is selected because these are softer metals with lower friction behavior. These metals also have better bonding qualities with respect to the abrasive particles. Ferrous metals, such as the steels and their alloys, could not be used, inasmuch as a tool which is formed of steel would create a high friction when applied against a surface to be super-finished. For purposes of the present description, the non-ferrous metal screen formed of the metal filaments will be most usually referred to as wire cloth or screen. The abrasive particles may be of various types, and a diamond grit of selected sizes is advantageous. Silicon carbide and aluminum oxide are other good brasives for hard surfaces, and other abrasives may be utilized, as will be appreciated by those skilled in the art. The abrasive, of course, must be harder than the material to be superfinished.

The charging of the wire cloth or screen may be accomplished by sprinkling the abrasive particles over the surface of the screen. To avoid the waste, a liquid may be used having adhesive qualities to cause adherence between the particles and the wires forming the screen or wire cloth. A grease paste or wax-type mixture of liquid, such as grease or wax containing a dispersion of abrasive particles may be applied, such as by brushing or the like, to achieve the coated area illustrated at 13 in FIGURE 1.

The abrasive also may be prepared in stick form made up of a mixture of beeswax and caranuba wax with the abrasive particles dispersed therein, and the particles may then be applied by rubbing the stick on the surface of the screen.

It may be desirable to aid adherence between the particles and the screen, such as when the abrasive particles are sprinkled dry on the screen. For this purpose, the surface of the screen is subjected to a pressure, as by being rolled, as illustrated in FIGURE 2. This may also be done if a heavy charge of abrasive is to be placed in the screen. A coated screen 17, carrying a coating of abrasive particles 19 is positioned on a hard supporting surface 16 and a roller 18 is rolled back and forth over the surface of the screen.

With or without the step of FIGURE 2, the screen which is shown in the coated state at 20 in FIGURE 3, is gathered into a mass, such as by being rolled up into a tubular roll 21.

If the abrasive were applied dispersed in an adhering carrier, such as grease or wax, the carrier may be removed with a solvent at this time, and the abrasive will remain impregnated in the screen. However, the grease or wax carrier may be left in the screen and will serve in the finished tool as a coolant and to reduce friction during superfinishing.

The gathered mass or roll 21 is then placed into a die 22, provided with a die cavity 23, FIGURE 4. The die cavity is defined by side walls 24 and 26 of the die, and by a concave bottom wall 27. A ram 29 fits into the open upper end of the die, and has a lower rounded end 29a for purposes of shaping the tool. The die walls are supported on a bass 28.

As illustrated in FIGURE 5, means are provided for applying a vertical downward force at 30 (indicated schematically by the arrow 30) to the ram 29 to compress the gathered wire screen into a pallet or finished tool 31. The application of a force on the ram 29 will compress and mash the material into the finished tool to a density forming a hard rigid tool. The tool, however, is not brittle, and is not fragile. The compression forces the abrasive particles into the surfaces of the threads or filaments of the screen so that the metal of the screen is actually bonded to the particles of abrasive.

The finished tool 31, as illustrated in FIGURE 6, has the particulate adhesive material evenly and uniformly distributed therethrough, bonded in fixed positions in the material of the threads of the wire screen. The particles of abrasive cannot fall out or be squeezed out, and cannot be pressured out. There are no openings for the particles to drop out, and in any event, the particles cannot fall away from the tool, since the particles are embedded in the wire of the screen.

The completed tool is shaped and does not have to be machined to shape. The curved surface 29a of the ram has formed a concave surface 31a in the tool which will conform to the cylindrical surface of the workpiece to be superfinished. It will be seen that the shape and measurements of the die will be preformed in accordance with the shape of the tool that is desired.

The tool has a curved upper surface 31b and flat side surfaces 31c and 31d for use in the manner as illustrated in FIGURES 7 and 8.

As illustrated in FIGURE 7, the tool 31 is applied to a workpiece 32 by pressing its lower surface 31a against the outer cylindrical surface 33 of the workpiece. The workpiece is illustrated as having an end 34 and another end 36, and an extension 37, which is part of the workpiece and may be utilized for mounting the workpiece in a support and for driving it in rotation, as indicated by the arrow 40. The tool 31 is carried in a tool holder 38, provided with a tool slot 39 in which the tool is mounted for sliding follow-up motion. The tool is applied to the workpiece 32 with a pressure, as indicated by the arrow 41. The tool is reciprocated or oscillated axially during rotation of the workpiece 34 by movement of the tool holder 38, as indicated by the arrow 45.

The radius of the surface 31a of the tool fits the curvature of the surface 32 of the workpiece. If an internal surface of a workpiece were being finished, the tool would be formed with a convex surface.

The tool is under pressure against the work, and this pressure, as indicated by the arrow 41, is varied at the will of the operator of the superfinishing machine. The pressure causes the grit in the tool to do the cutting, and the tool will hold its form and wear away to bring a continual fresh supply of grit to the working surface. The compressed screen which has the particles embedded therein is softer than the working surface and will wear away and keep the tool in correct shape. The abrasive is uniformly distributed and will continually present a uniform cutting surface to the workpiece. Since the uniformity of distribution or dispersion of the abrasive extends throughout the tool, the tool will have a long operating life, and can be used until it is substantially worn away.

FIGURE 8 also illustrates a workpiece 40 being superfinished by the tool 31. The workpiece is supported in a lathe or similar mechanism for driving it in rotation, and is held by a tailpiece 42 and driven in rotation by a headpiece 44. The workpiece 40 is illustrated as provided with a shoulder 43. This shoulder will illustrate the manner in which fragile and brittle workpieces are easily broken. With different workpieces, their dimensions may vary slightly and when the tool 31 is moved axially, it may strike the shoulder 43 and break. With the present tool, however, inasmuch as it is not brittle nor fragile, it will continue satisfactory operation, thereby avoiding the cost of replacement.

The fabricated tool 31, therefore, is a shaped, non-fragile, non-brittle, uniform mass of non-ferrous material having a particulate hard surfaced abrasive material evenly distributed throughout and embedded in the threads or fibers of non-ferrous material from which the mass is formed.

In forming the tool, a screen or wire cloth of non-ferrous strands or threads, as illustrated at 11 in FIGURE 1, is coated with an even distribution of particulate abrasive material 12. The cloth may be rolled, such as illustrated in FIGURE 2, or may be directly rolled into a tube 21, FIGURE 3. The tube is then placed in a die 22 and a ram 29 is forced down into the die to compress the tool and form the tool pallet 31, as illustrated in FIGURE 6. The tool is mounted in a tool holder 38 which is oscillated axially, as indicated by the arrow 45, while the workpiece 32 is rotated. A vertical pressure 41 is applied to the workpiece.

Thus it will be seen that I have provided an improved method of making a tool and a tool structure for superfinishing a metal surface, which meets the objectives and advantages hereinbefore set forth. The tool provides a rigid element which is not brittle nor fragile, and which is inexpensive to construct in accordance with the method, and which is capable of a long reliable and satisfactory operating life.

I have, in the drawings and specification, presented a detailed disclosure of the preferred embodiment of my invention, and it is to be understood that I do not intend to limit the invention to the specific form disclosed, but intend to cover all modifications, changes and alternative constructions and methods falling within the scope of the principles taught by my invention.

I claim as my invention:

1. The method of forming a tool having particles of abrasive in a uniform distribution pattern supported in a soft metal for superfinishing metal surfaces which comprises charging a screen-like wire cloth formed of non-ferrous threads with abrasive by supporting the wire cloth on a hard surface, applying a layer of viscous liquid having adhesive properties and containing a dispersement of particulate abrasive over the surface of the wire cloth, and applying a roller over the surface of the cloth to force the abrasive into the surface thereof, rolling the wire cloth into a compact cylindrical shape, applying a solvent to the rolled wire cloth to remove the liquid therefrom and leave the charge of distributed particulate abrasive, and compressing the wire cloth to a density forming a hard metal locked abrasive pallet to provide a self-wearing tool for presenting particles of evenly distributed abrasive to the surface of a metal workpiece to be superfinished.

2. The method of forming a tool having particles of abrasive in a substantially uniform distribution pattern in a soft metal support for superfinishing metal surfaces which comprises distributing a layer of particulate abrasive over the surface of a porous cloth-like material formed of threads of soft metal, gathering the metal into a mass, and compressing the mass to a density to form a hard body with the abrasive forced into bonding relationship with the surfaces of the threads so that the compressed mass will obtain a wearing tool for presenting particles of abrasive in a fixed position to the surface of the metal workpiece to be superfinished.

3. The method of forming a tool having particles of abrasive in a uniform distribution pattern in a soft metal support for superfinishing metal surfaces which comprises spreading a dispersement of particulate abrasive in a liquid over a surface of a screen-like cloth material formed of threads of non-ferris metal, gathering the material into a mass, and compressing the mass to a density to form a hard body with the abrasive forced into bonding relationship with the surfaces of the threads so that the compressed mass will provide a wearing tool for presenting particles of abrasive in a fixed position to the surface of a metal workpiece to be superfinished.

4. The method of forming a tool having particles of abrasive carried in a uniform distribution pattern in a soft metal support for superfinishing metal surfaces which comprises adhering a distribution particulate abrasive material to the surfaces of threads arranged to form a screen-like cloth material utilizing a liquid having adhesive properties, gathering the material into a mass, and compressing the mass to a density to form a hard body with the abrasive material forced into bonding relationship with the surfaces of the threads so that the compressed mass may be utilized as a tool for presenting particles of abrasive in a fixed supported position to the surface of a metal workpiece to be superfinished.

5. The method of forming a tool having supported particles of abrasive in a uniform distribution pattern for superfinishing metal surfaces which comprises adhering a distribution of particulate abrasive material to the surfaces of threads arranged to form a screen-like cloth material utilizing a liquid having adhesive properties, gathering the material into a mass, applying a liquid to the mass which is a solvent to said liquid having adhesive properties for removing the liquid with the abrasive material remaining impregnated in the mass, and compressing the mass to a hardened element to force the abrasive particles into bonding relationship with the surfaces of the metal threads so that the element will provide a tool for superfinishing a metal workpiece.

6. The method of forming a tool having particles of distributed abrasive for superfinishing metal surfaces which comprises spreading a dispersement of particulate abrasive over the surface of a screen-like material formed of threads of non-ferrous metal, rolling the screen-like material into tubular form with the abrasive impregnated therein, and compressing the rolled tubular material to form a hard body with the abrasive forced into bonding relationship with the surfaces of the threads so that the compressed mass will provide a self-wearing tool for presenting particles of abrasive to the surface of a metal workpiece to be superfinished.

7. A fabricated tool for finishing a metal surface comprising a compressed mass of screen-like material with particulate abrasive dispersed uniformly therethrough, said screen-like material formed of filaments woven into a screen-like layer to receive particles of the abrasive between the filaments and gathered and compressed into said mass, said particles being evenly distributed between the surfaces of the filaments and supported solely by the filaments in the compressed mass.

8. A fabricated tool for finishing a metal surface comprising a compressed mass of screen-like material with particulate abrasive dispersed uniformly therethrough between filaments of said material and with particles of said abrasive embedded between and supported solely by filaments of the compressed material.

9. The method of forming a tool having particles of abrasive for finishing metal surfaces which comprises forming a mixture of particulate abrasive in a carrier of liquid spreading material, spreading said liquid over a layer of screen-like non-ferrous material having openings sufficiently large to admit said particles when pressed thereagainst, applying a rolling pressure to the mixture on said surface forcing particles of said abrasive between filaments of said screen-like material, and gathering and compressing said layer of screen-like material and said mixture to form a compressed tool with the abrasive particles embedded between filaments of the compressed screen material.

10. The method of forming a tool having particles of abrasive for finishing metal surfaces which comprises spreading particulate abrasive over a layer of screen-like material, applying a pressure to the particles of said abrasive forcing them between the filaments of said screen-like material, and gathering and compressing the screen-like material with the particles embedded in and supported solely by said screen-like material and being dispersed uniformly in the compressed material.

References Cited in the file of this patent

UNITED STATES PATENTS

| | | |
|---|---|---|
| 1,520,488 | Tone | Dec. 23, 1924 |
| 1,885,119 | Loewy | Nov. 1, 1932 |
| 1,991,834 | Albertson | Feb. 19, 1935 |
| 1,993,823 | Binns | Mar. 12, 1935 |
| 2,225,937 | Williamson | Dec. 24, 1940 |
| 2,705,194 | St. Clair | Mar. 29, 1955 |
| 2,899,288 | Barclay | Aug. 11, 1959 |